United States Patent [19]

Iwata et al.

[11] Patent Number: 4,472,039
[45] Date of Patent: Sep. 18, 1984

[54] PHOTOGRAPHIC LENS DEVICE HAVING A STEP MOTOR MOUNTED ON THE LENS BARREL

[75] Inventors: Hiroshi Iwata; Toshitsugu Kashihara; Tsunemi Yoshino, all of Nara; Akitoshi Morioka, Osaka, all of Japan

[73] Assignee: West Electric Co., Ltd., Osaka, Japan

[21] Appl. No.: 400,680

[22] Filed: Jul. 22, 1982

[30] Foreign Application Priority Data

Jul. 23, 1981 [JP] Japan ............................ 56-115734

[51] Int. Cl.$^3$ ............................................. G03B 9/06
[52] U.S. Cl. .................................................. 354/271.1
[58] Field of Search ................... 354/270, 271.1, 274, 354/230

[56] References Cited

U.S. PATENT DOCUMENTS 4,005,448  1/1977  Iwata et al. ...................... 354/230
4,113,359  9/1978  Koike et al. ...................... 354/274

Primary Examiner—A. A. Mathews
Attorney, Agent, or Firm—Burgess, Ryan & Wayne

[57] ABSTRACT

A photographic lens device with a built-in electronic aperture-stop control system or mechanism comprising a step motor and an aperture-stop setting device which are spaced apart from each other by a suitable distance in the direction of the optical axis of the photographic lens system and are coupled to each other through a coupling means. In one embodiment, the aperture-stop control system can be incorporated in the lens device simply by slightly enlarging the diameter of the lens device or barrel without increasing its axial length because of full possible use of a heretofore unused dead space available in the lens device.

4 Claims, 5 Drawing Figures

PHOTOGRAPHIC LENS DEVICE HAVING A STEP MOTOR MOUNTED ON THE LENS BARREL

BACKGROUND OF THE INVENTION

The present invention relates to a photographic lens device of the type in which a step motor is employed to drive an aperture-stop setting means or its blades.

In the photographic lens devices of the type described, in response to an electrical control signal from a camera body, the step motor is driven to drive a plurality of iris type blades to set a predetermined aperture stop. A variety of such photographic lens devices have been so far devised and demonstrated, but the motor used is of the so-called power motor; that is, a motor in which the rotor substantially occupies the space defined by the stator and the power is transmitted through the shaft of the rotor. As a result, the power motor must be disposed at a suitable space outside of the lens barrel; that is, the light path through the lens system, so that the photographic lens device becomes enlarged in size especially in the radial direction. Therefore, some photographic lens barrels are not cylindrical in shape.

The same inventors proposed an aperture stop control system in which a step motor drives a plurality of blades as is disclosed in U.S. Pat. No. 4,005,448, granted to the same applicant even though this system was not shown as being applied to the photographic lens device. This system is also capable of controlling a shutter speed. The step motor employed is featured in that its rotor is in the form of a hollow cylinder and is operatively coupled to a plurality of blades which are disposed within the rotor. Therefore, the light rays can pass through the ring-shaped rotor and an aperture stop defined by the blades. The system can be used as an exposure control system.

The step motor of the type described can eliminate an intermediate transmission means which is extended along the axis of rotation of the rotor so as to connect it to the blades. To put it another way, the hollow cylindrical rotor can be directly connected to the blades. In addition, the light rays are permitted to pass through the step motor. Therefore, it becomes possible to provide an exposure control system which is cylindrical in shape.

Photographic lens devices are in general extremely high precision products including a mechanism for converting the rotation of a focusing ring into the straight translation of a lens barrel or a photographic lens system to be referred to as "a helicoidal mechanism" in this specification. It follows, therefore, that it is almost impossible to freely change their designs, and consequently; the position of the exposure control system of the type described in the photographic lens device is limited. In general, a set of aperture-stop control blades is interposed between lens elements and it is, of course, most preferable to not change its position even when a step motor or the like for driving the blades is disposed within the photographic lens device so that photographic lens devices with a built-in, motor-driven aperture-stop control system may be substantially similar in shape to the conventional photographic lens devices.

In the previously proposed aperture-stop control system of the type described, a set of blades is disposed very closely to the rotor of a step motor through a coupling or driving means and radially inwardly of the rotor. Accordingly, in order to build the conventional aperture-stop control system into a space for containing aperture blades between two lens elements in the lens barrel, the space has to be expanded in the axial direction because there is no space to contain the rotor of the step motor in the conventional lens barrel. As a result, the lens barrel has to be extended in the axial direction, which is undesirable for cameras.

SUMMARY OF THE INVENTION

One of the objects of the present invention is, therefore, to provide a photographic lens device incorporating therein an exposure control system comprising a step motor and a set of blades which are driven by the step motor.

Another object of the present invention is to provide a photographic lens device which can be made as compact in size and light in weight as comparable conventional photographic lens devices even though it incorporates the exposure control system of the type described. To this end, the rotor of the step motor is spaced apart from the set of blades in the axial direction of the photographic lens device and they are operatively coupled to each other through a connecting means. Furthermore, the step motor is disposed in a heretofore unused space or dead space by increasing it very slightly or without requiring any extension thereof in one embodiment. Therefore, the photographic lens devices of the present invention can be made very compact in size even though they incorporate therein a step-motor-driven exposure control system.

More particularly, according to the present invention, an aperture-stop setting device; that is a device comprising a set of iris type blades and its actuating means is disposed in axially spaced apart relationship with the rotor of a step motor, but in coaxial relationship therewith. The rotor and the aperture-stop setting device are operatively coupled to each other through a connecting means. Only the aperture-stop setting device is disposed in the optical or photographic lens system as with the conventional lens devices. Fullest possible use is made of a heretofore unused or dead space so as to dispose a step motor radially outwardly and coaxially of the lens barrel.

BRIEF DESCRIPTION OF THE DRAWINGS

The same reference numerals are used to designate similar parts throughout the figures.

DESCRIPTION OF THE PREFERRED EMBODIMENTS

Figure 1:
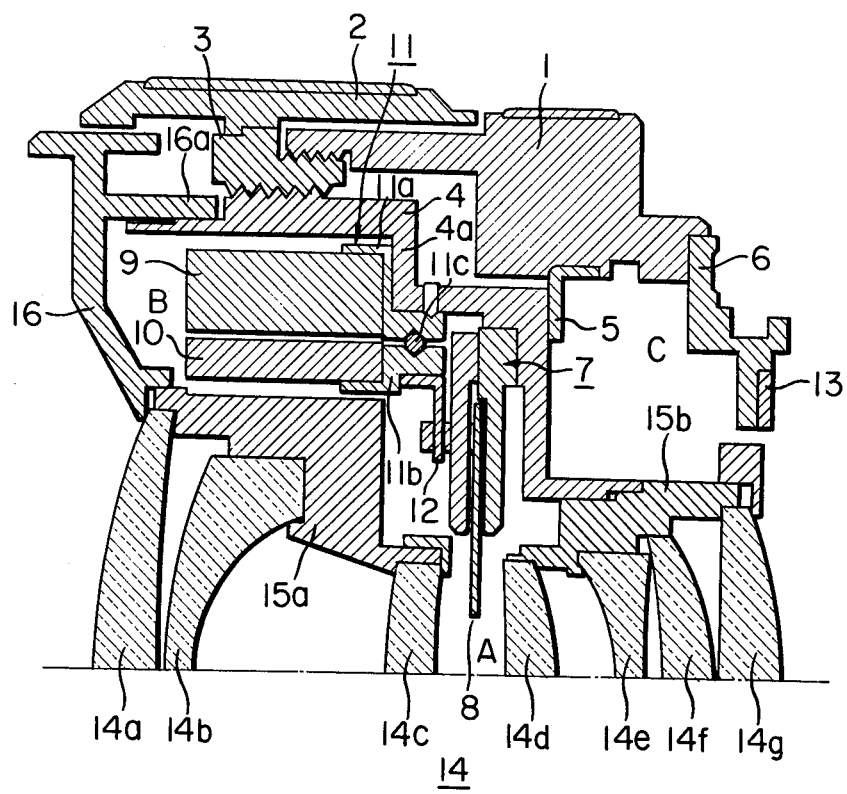
FIG. 1 is a half sectional view of a first embodiment of the present invention.
Figure 2:
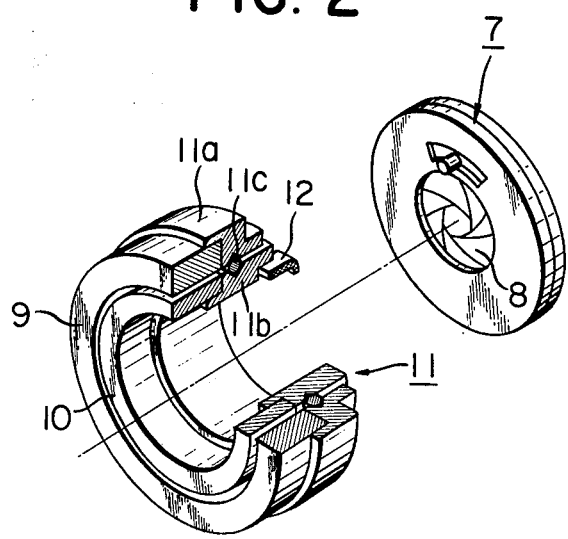
FIG. 2 is an exploded perspective view of the exposure control system thereof.

First Embodiment, FIGS. 1 and 2

In FIG. 1 is shown a first embodiment of the present invention in longitudinal section. Reference numeral 1 denotes a stationary barrel with a mount 6 for engagement with a lens mount on the side of a camera body (not shown); 2, a focusing ring; and 3, an intermediate barrel or ring which is securely mounted on the focusing ring 2 and has external threads in mesh with internal threads of the stationary barrel 1 so that upon rotation of the focusing ring 2, the intermediate barrel 3 is caused to move in the axial direction that is, along the optical axis relative to the stationary barrel. Reference numeral 4 shows a helicoidally movable barrel to be referred to as "the helicoid or lens barrel" for brevity in this specification which holds a lens system comprising a plurality of lenses or lens groups and which has external threads in mesh with internal threads of the intermediate barrel 3. The vertical or downwardly extending leg portion of an L-shaped guide 5 is securely attached to the rear end of the lens barrel 4 and the horizontal base portion thereof is slidably fitted into a straight key guide groove of the stationary barrel 1, so that upon rotation of the focusing ring 2 and hence the intermediate barrel or ring 3, the lens barrel 4 is caused to move axially in a straight line. Reference numeral 7 illustrates an aperture setting device or unit securely mounted on the lens barrel 4; and 8, aperture setting blades thereof.

Reference numeral 9 indicates the stator of a step motor of the conventional type comprising a comb-shaped electrode structure and a coil; and 10, the rotor thereof comprising a ring-shaped permanent magnet. Since the step motor does not constitute the present invention, it is not shown in detail. The stator 9 and the rotor 10 are coupled to each other by means of a bearing 11 comprising an outer race 11a, an inner race 11b and a plurality of rolling elements or balls 11c. The stator 9 is securely connected to the lens barrel 4 through the outer race 11a and the rotor 10, to the aperture setting device or unit 7 through the inner race 11b and a connecting member 12 which interconnects between the inner race 11b and the aperture setting device or unit 7. The aperture setting device or unit 7 rotates in unison with the rotor 10.

Reference numeral 13 denotes a terminal bank for electrical connection between the photographic lens device and the camera body (not shown); 14, a focusing lens system comprising lens groups or elements 14a–14g; 15a and 15b, lens retainers; and 16, a front lens retainer or holder which supports the front lens 14a and the lens retainer 15b and is securely mounted on the lens barrel 4.

In operation, the focusing ring 2 is rotated to focus an object or subject, but the stationary barrel 1 with the mount 6 and the terminal bank 13 remains stationary while the intermediate barrel or ring 3 which is securely mounted on the focusing ring 2 rotates, so that the lens barrel 4 is caused to move axially forwardly or backwardly of the camera body because it is guided by the guide 5 as described previously. As a consequence, the step motor; that is, the stator 9 and rotor 10 which are connected through the bearing 11 to the lens barrel 4 and the focusing lens system 14 mounted on the lens barrel 4 through the retainers 15a, 15b and 16 are caused to translate in unison with the lens barrel 4.

As is best understood from FIG. 2, even though the aperture setting device or unit 7 is operatively connected through the connecting member 12 to the inner race 11b of the bearing 11 which in turn is connected to the rotor 10 of the step motor, there does exist a space between the step motor (9, 10 and 11) and the aperture setting or control device 7. To put in another way, the aperture control device or unit 7 does not exist within the rotor 10.

It is this arrangement that makes it possible to incorporate the aperture control mechanism comprising the aperture setting device 7 or blades 8 and the step motor 9 and 10 into the photographic lens device more compactly. More specifically, of the aperture control mechanism, only the aperture setting device 7 can be interposed in a space A between the adjacent lens elements 14c and 14d as shown in FIG. 1. The space A for the aperture setting device or unit 7 is substantially the same as in the conventional photographic lens devices, but its associated step motor (9 and 10) can be incorporated in the photographic lens device without extending its axial length. That is, the step motor (9 and 10) can be disposed radially outwardly of the lens retainer or holder 15a in the annular space B.

The space B available for the step motor (9 and 10) varies in size or volume depending upon the types of photographic lens systems, but such space B does exist in every conventional photographic lens device as a dead space even though the dead space is not big enough to install a step motor. Such a dead space can be readily enlarged enough for installation of a step motor. For instance, as shown in FIG. 1, instead of a conventional straight lens barrel having the same diameter throughout its length the lens barrel 4 is stepped (one stepped portion being indicated by the reference numeral 4a), so that it has a large-diameter portion or bore and a small diameter-portion or bore between the step 4a. The step motor; that is, the stator 9 and the rotor 10 are disposed in the large-diameter portion or bore; that is, the space B, radially outwardly of the front lens system 14a–14c and the outer race 11a is securely fitted into the small-diameter portion or bore.

According to the present invention, therefore, the aperture control system or mechanism comprising the aperture setting device 7 or blades 8 and the driving step motor (9 and 10) can be compactly incorporated in the photographic lens device simply by slightly enlarging the outer diameter thereof but without extending its axial length. As a result, the overall length in the axial direction of cameras remains short even though the mounted lens device includes a built-in step-motor-driven aperture control system or mechanism.

In summary, according to the first embodiment of the present invention, in the aperture control mechanism or system the aperture setting device 7 or blades 8 and the step motor (9 and 10), which is a means for controlling or driving the aperture setting device 7 or blades 8, are spaced apart from each other but the former is operatively coupled to the inner race 11b of the bearing 11 of the step motor (9 and 10) through the connecting member 12 and the step motor is disposed in the space between the lens retainer 15a and the lens barrel 4 which has been heretofore left as a dead space in the conventional photographic lens device. As a result the step-motor-driven aperture control system or mechanism can be compactly incorporated into the photographic lens device.

Figure 3:
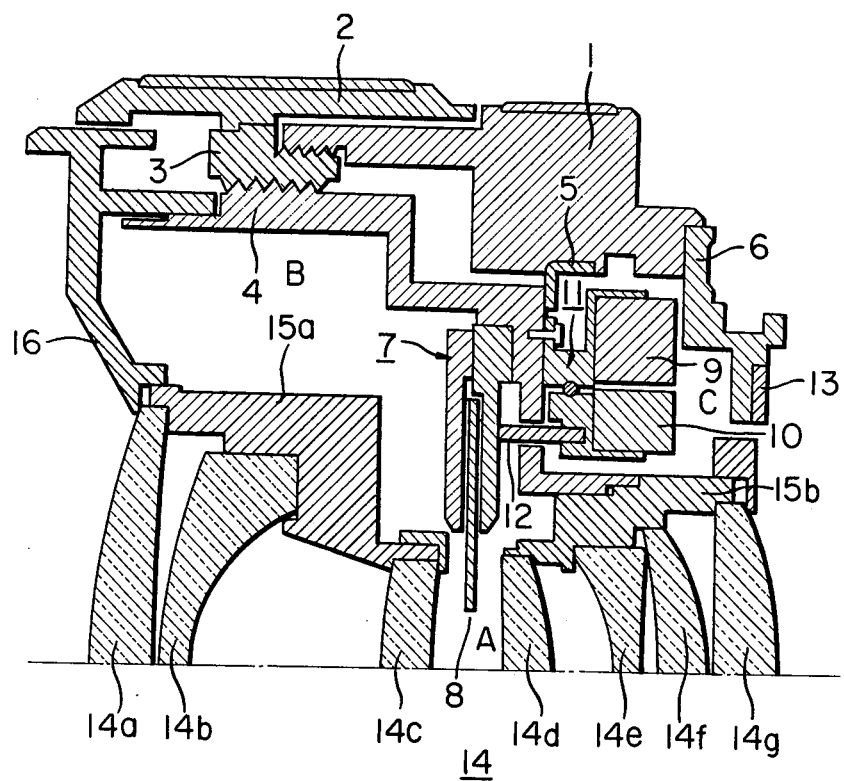
FIG. 3 is a sectional view of a second embodiment of the present invention.

Second Embodiment, FIG. 3

While the step motor (9 and 10) is disposed between the annular space B between the front lens retainer 15a and the lens barrel 4 in the first embodiment, in the second embodiment it is disposed in an annular space C provided between the stationary barrel 1 and the rear lens retainer or holder 15b and closer to the camera body (not shown). In the cases of photographic lenses of the type whose aperture-stop setting blades (such as 8) must be mechanically coupled to a driving or control device in a camera body, a space which corresponds to the space C in FIG. 3 must be provided to mount a mechanical coupling means. However, according to the present invention, the aperture control system or mechanism can be electrically coupled to the camera body through the terminal bank 13 and other electrical or electronic devices incorporated in the photographic lens device can be also electrically connected to the main body through other terminals. That is, the photographic lens devices of the present invention need no mechanical coupling means, so that the space for such means can be used for disposing the step motor (9 and 10) and its bearing 11. Therefore, the second embodiment can utilize more fully an available space in the photographic lens device than the first embodiment as will be described in more detail below.

If a photographic lens device is designed with great care and in case of a special photographic lens system, the space; that is the space B, between the lens barrel 4 and the front lens retainer or holder 15a can be substantially eliminated so that it must be enlarged, as with the first embodiment, to install the step motor (9 and 10). According to the second embodiment, however, fullest possible use is made of the space C which would be left as a dead space if electrical or electronic connection between the camera body and the photographic lens device is not employed as described previously.

As with the first embodiment, the step motor (9 and 10) in the space C is spaced apart from the aperture setting device 7 or blades 8 but they are operatively coupled to each other through the connecting member 12.

In the first or second embodiment, in response to the electrical control signal transmitted from the camera body, the rotor 10 is rotated stepwise about the axis of the lens system 14 and consequently the rotation of the rotor 10 is transmitted through the connecting member 12 to the aperture setting device 7 or its blades 8, whereby the latter is driven to set a predetermined aperture stop.

Figure 4A:
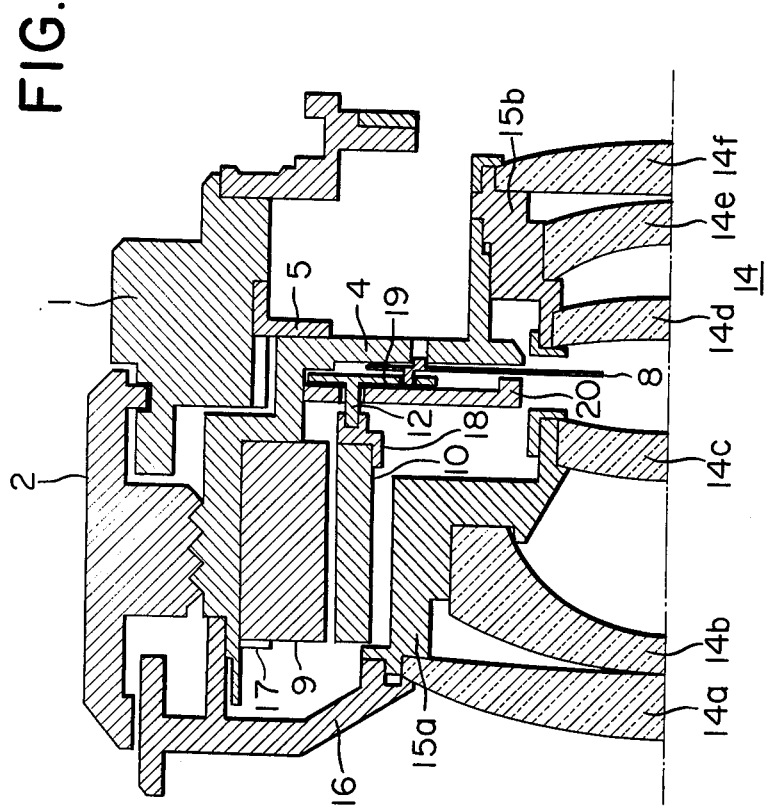
FIG. 4(A) is a sectional view of a third embodiment of the present invention.
Figure 4B:
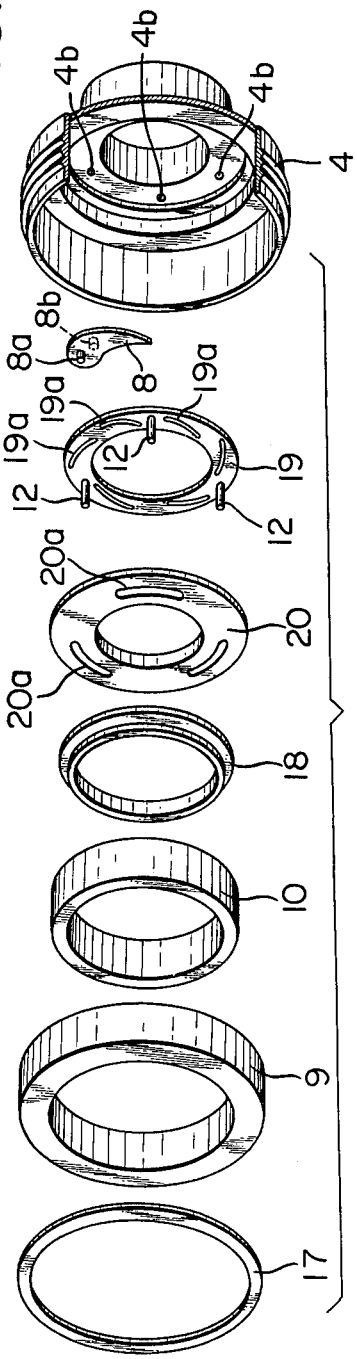
FIG. 4(B) is an exploded perspective view of the exposure control system thereof.

Third Embodiment, FIGS. 4(A) and 4(B)

In FIG. 4(A), is shown a third embodiment of the present invention in which the arrangement of the step motor (9 and 10) is substantially similar to that of the first embodiment described with reference to FIG. 1, but the bearing 11 in the first embodiment is eliminated and furthermore the aperture setting device 7 is directly connected to the rotor 10 as will be described in detail below.

As best shown in FIG. 4(B), the aperture setting device 7 comprises a plurality of blades 8, an actuating ring 19 and a pressure ring 20. Each blade 8 has a guide pin 8a and a pivot pin 8b which is fitted into a pivot-pin receiving hole 4b of the lens barrel 4. The actuating ring 19 is formed with a plurality of curved grooves 19a into which are slidably fitted the guide pins 8a of the blades 8. The pressure ring 20 which is pressed against the actuating ring 19 coaxially thereof is formed with a plurality of arcuate grooves 20a into which are fitted slidably a plurality of connecting pins 12 extended from the actuating ring 19. The connecting pins 12 are extended through the arcuate grooves 20a of the pressure ring 20 and securely fixed in a suitable manner to a connecting ring 18 which in turn is rigidly secured to the rotor 10. Therefore, the rotation of the rotor 10 is transmitted through the connecting ring 18 and the actuating ring 19 to the blades 8 so that they are rotated about their pivot pins 8b to define a predetermined aperture stop.

As described hereinbefore, the third embodiment can eliminate the use of the bearing 11 and can establish the direct connection between the rotor 10 of the step motor and the aperture setting device or blades 8, so that, as compared with the first or second embodiment, the component parts can be minimized in number.

While the first or second embodiment uses only one connecting member 12 between the rotor 10 and the aperture setting device 7, the third embodiment uses a plurality (three in FIG. 4) of connecting pins 12. The reason is that in the third embodiment the connecting pins 12 have a double function of (a) interconnecting between the rotor 10 and the aperture setting device and (b) supporting the rotor 10 as well.

In the third embodiment, as shown in FIG. 4(A), a retaining ring 17 is used to securely hold the stator 9 of the step motor relative to the lens barrel 4, but it is to be understood that not only the retaining ring 17 but also the connecting ring 18 can be eliminated if the stator 9 and the rotor 10 are suitably designed. That is, the stator 9 can be mounted securely on the lens barrel without the use of the retaining ring 17 and the connecting pins 12 of the actuating ring 19 can be directly connected to the rotor 10.

As described previously, the third embodiment uses a minimum number of component parts and further can eliminate the use of the bearing 11 of the first or second embodiment, so that adverse effects caused by the friction of the bearing 11 need not to be taken into consideration. To put it another way, as compared with the first or second embodiment, a step motor with less torque may be advantageously used in the third embodiment for driving the blades 8. As a result, the power consumption can be minimized and more accurate control of blades 8 can be possible. Furthermore, it is apparent that a step motor small in size can be used and its design can be simplified.

What is claimed is:

1. A photographic lens device having a rear coupling end and comprising:
    a step motor comprising a stator and a hollow cylindrical rotor;
    an aperture-stop setting means including a plurality of blades and a control means for controlling the movement of said blades; and interconnecting means for transmitting the rotation of said rotor of the step motor to said aperture-stop setting means which is spaced apart from said rotor by a suitable distance in the direction of the optical axis of the photographic lens device wherein said step motor and said aperture-stop setting means are mounted on a lens barrel which mounts a photographic lens system comprising a plurality of lens elements in coaxial relationship and which is formed with helicoidal threads in engagement with corresponding threads of a focusing ring so that upon rotation of said focusing ring said lens barrel is translated in parallel with the optical axis of said photographic lens system.

2. A photographic lens device as set forth in claim 1 wherein said rotor of said step motor is connected to a connecting means of said aperture-stop setting means through a bearing which supports said rotor.

3. A photographic lens device as set forth in claim 1 wherein said step motor is disposed in a space defined in the vicinity of the rear coupling end of said photographic lens device.

4. A photographic lens device of the type having a lens barrel which holds a photographic lens system and is provided with a helicoid thread means so that said lens barrel can be translated in parallel with the optical axis of said photographic lens system, wherein
- an aperture-stop setting means mounted in said lens barrel and comprising
- a plurality of blades disposed in said photographic lens system for setting a predetermined aperture stop coaxial of said photographic lens system,
- a blade supporting means which swingingly supports said blades,
- an actuating ring for controlling the swinging motion of said blades, said actuating ring having a plurality of equidistantly spaced guide grooves into which are slidably fitted guide pins extended from respective blades so that the swinging motion of said blades can be controlled, and
- a pressure ring which is pressed against said actuating ring in such a way that the latter can be rotated relative to the former;
  - a plurality of coupling means extended from said actuating ring of said aperture-stop setting means in parallel with the optical axis of said photographic lens system and through arcuate guide slots formed through said pressue ring; and
- a step motor comprising
  - a hollow cylindrical stator disposed coaxially of said lens barrel in radially outwardly spaced apart relationship therewith, and
  - a rotor disposed for rotation in said stator but in radially outwardly spaced apart relationship with said lens barrel.

* * * * *